United States Patent
Beadle et al.

(10) Patent No.: US 6,295,641 B1
(45) Date of Patent: Sep. 25, 2001

(54) METHOD AND APPARATUS FOR DYNAMICALLY SELECTING BYTECODES FOR JUST IN TIME COMPILING IN A USER'S ENVIRONMENT

(75) Inventors: Bruce Anthony Beadle, Round Rock; Michael Wayne Brown, Georgetwon; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,976

(22) Filed: Dec. 3, 1998

(51) Int. Cl.[7] .................................................. G06F 9/45
(52) U.S. Cl. ........................................ 717/5; 717/4; 717/9
(58) Field of Search .................................. 717/5, 6, 7, 4, 717/9

(56) References Cited

U.S. PATENT DOCUMENTS

| | | | |
|---|---|---|---|
| 5,274,815 | * 12/1993 | Trissel et al. | 395/700 |
| 5,920,718 | * 7/1999 | Uczekaj et al. | 395/702 |
| 5,920,720 | * 7/1999 | Toutonghi et al. | 395/705 |
| 5,960,202 | * 9/1999 | Granston et al. | 395/705 |
| 5,987,258 | * 11/1999 | Daniel et al. | 395/709 |
| 6,081,655 | * 6/2000 | Carter et al. | 395/500.2 |
| 6,110,226 | * 8/2000 | Bothner | 717/7 |

OTHER PUBLICATIONS

Benton et al. Compiling Standard ML to Java Bytecodes. ACM. pp. 129–140. Apr. 1998.*
Krall. Efficient Java VM Just-in-Time Compilation. ACM. 1998.*

* cited by examiner

*Primary Examiner*—Kakali Chaki
*Assistant Examiner*—Wei Zhen
(74) *Attorney, Agent, or Firm*—Duke W. Yee; Michael R. Nichols; Jeffrey S. LaBaw

(57) ABSTRACT

A method and apparatus for providing a process in a computer for selectively just in time compiling a method. Compiling options for the method are presented on an output device. User input is received, changing the compiling options for the method. The method to just in time compile is monitored for a call. A determination is made as to whether the method should be compiled using the compiling options, responsive to detecting the call to just in time compile the method. The method is sent to a just in time compiler, responsive to a determination that the method is to be compiled.

31 Claims, 5 Drawing Sheets

| | | | | |
|---|---|---|---|---|
| 402 — Class/method A | JIT | IBM | Default | |
| 404 — Class/method B 414 | no JIT 416 | | | |
| 406 — Class/method C 418 | JIT 420 | IBM 422 | Size 424 | |
| 408 — Class/method D | no JIT | | | |
| 410 — Class/method E | no JIT | | | |
| 412 — Class/method F | JIT | Sun | Speed | |

400

METHOD AND APPARATUS FOR DYNAMICALLY SELECTING BYTECODES FOR JUST IN TIME COMPILING IN A USER'S ENVIRONMENT

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, Ser. No. 09/204,513, now U.S. Pat. No. 6,233,725. A Method And Apparatus To Selectively Control Processing Of A Method In A Java Virtual Machine, Ser. No. 09/204,512, Method And Apparatus For Automatic Service Of JIT Compiler Generated Errors, Ser. No. 09/204,511, A Method And Apparatus For Dynamic Selection Of Which Bytecodes Should Be Just In Time Compiled, Ser. No. 09/204,519, JIT/Compiler Java Language Extensions To Enable Field Performance and Serviceability, Ser. No. 09/204,968, A Method And Apparatus To Selectively Control Processing Of A Method In A Java Virtual Machine, Ser. No. 09/204,975, and Method And Apparatus For Dynamic Selection Of Instructions For Compiling Using Tags, Ser. No. 09/204,516, all of which are filed even date hereof, assigned to the same assignee, and incorporated herein by reference.

BACKGROUND OF THE INVENTION

1. Technical Field

The present invention relates generally to an improved data processing system and in particular to an improved method and apparatus for processing a method in a Java virtual machine. Still more particularly, the present invention relates to a method and apparatus for selectively controlling just in time compilation of a method.

2. Description of Related Art

Java is an object oriented programming language and environment focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java virtual machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures.

When extra speed in executing a Java program or applet is needed, a just in time (JIT) compiler may be used to translate bytecodes for a method or class into native machine instructions before executing them. Typically, this compilation only occurs once per method. Some JIT compilers may compile entire classes, rather than one method at a time.

In some situations, a JIT compiler may produce invalid results when compiling bytecodes from a given method of a class into instructions or machine code for execution on the computer. These errors do not occur if the code is not just in time compiled. Typically, these errors in execution of native instructions occur as a result of faulty logic in the JIT compiler. Currently, a mechanism for avoiding these errors is unavailable. In particular, a mechanism for allowing users of Java applications and applets to avoid these errors is unavailable.

Therefore, it would be advantageous to have an improved method and apparatus for just in time compiling of methods.

SUMMARY OF THE INVENTION

The present invention provides a process in a computer for selectively just in time compiling a method. Compiling options for the method are presented on an output device. User input is received, changing the compiling options for the method. The method to just in time compile is monitored for a call. A determination is made as to whether the method should be compiled using the compiling options, responsive to detecting the call to just in time compile the method. The method is sent to a just in time compiler, responsive to a determination that the method is to be compiled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
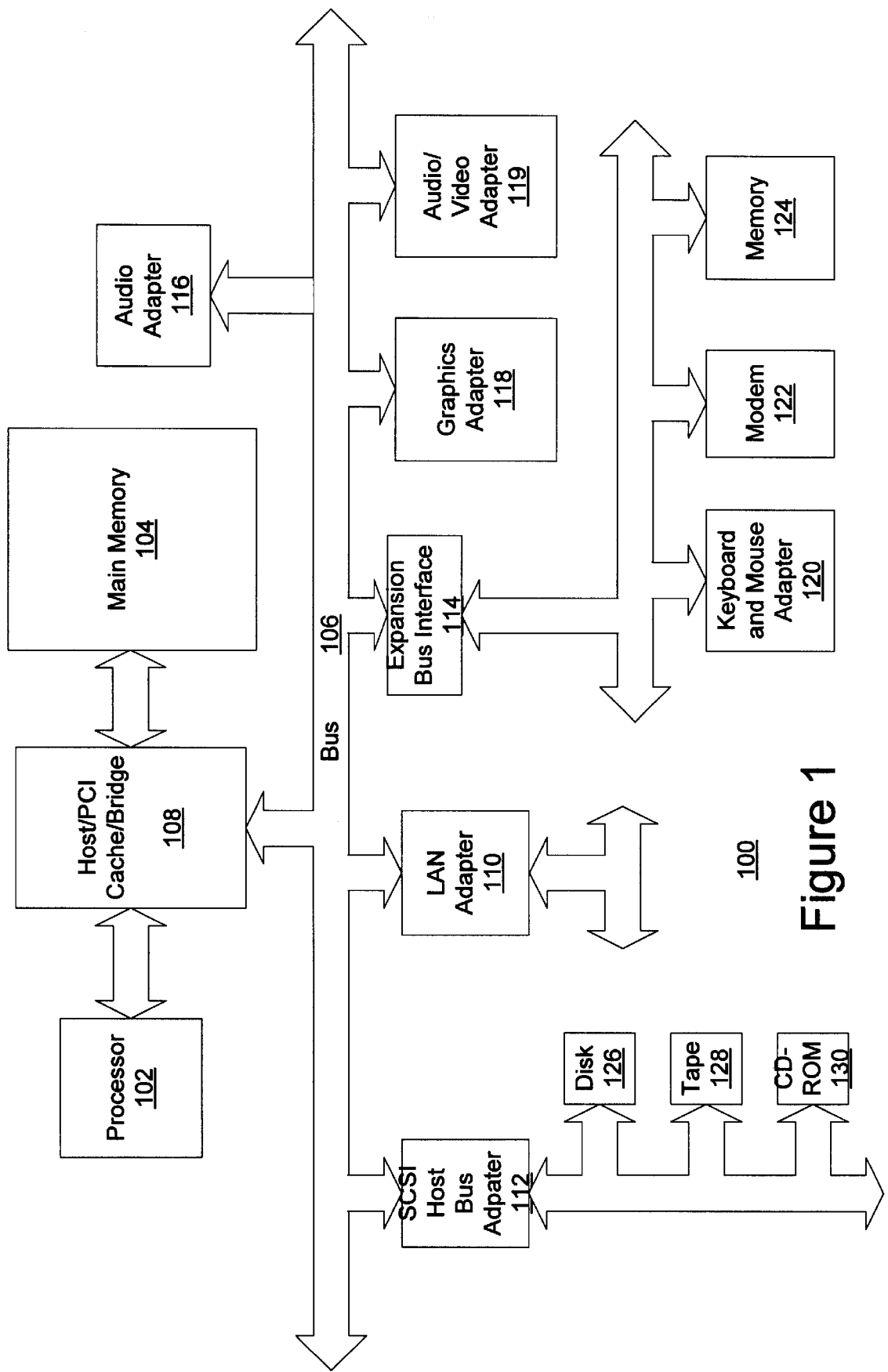
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing systems.

The present invention provides a method, apparatus, and instructions for selecting which methods are to be just in time compiled, also referred to as being "JITed". An interface, which may be a graphical user interface (GUI), is provided to allow a user of an application or applet to dynamically select or define which classes or methods within classes are to be just in time compiled. These selections are stored in a data structure, such as, for example, a text file or a database for use when an application or applet is executed.

The mechanism of the present invention also includes a second interface for use with a JVM. This second interface receives a call to just in time compile or "JIT compile" a method that is normally intended for the just in time (JIT) compiler. A determination is made as to whether to send the method to the JIT compiler. In the depicted example, the method is compared to a database or data structure containing user defined information about methods. If the method is to be JITed, the method is then passed by the interface on to the JIT compiler. Otherwise, the method might be returned to the interpreter in the JVM for processing. Alternatively, the processing of the method may be terminated. Using these processes, a user may dynamically select which classes or methods within a class should not be JITed to avoid errors while executing an application or applet without having to wait or request a revised version of the application or applet.

Figure 2:
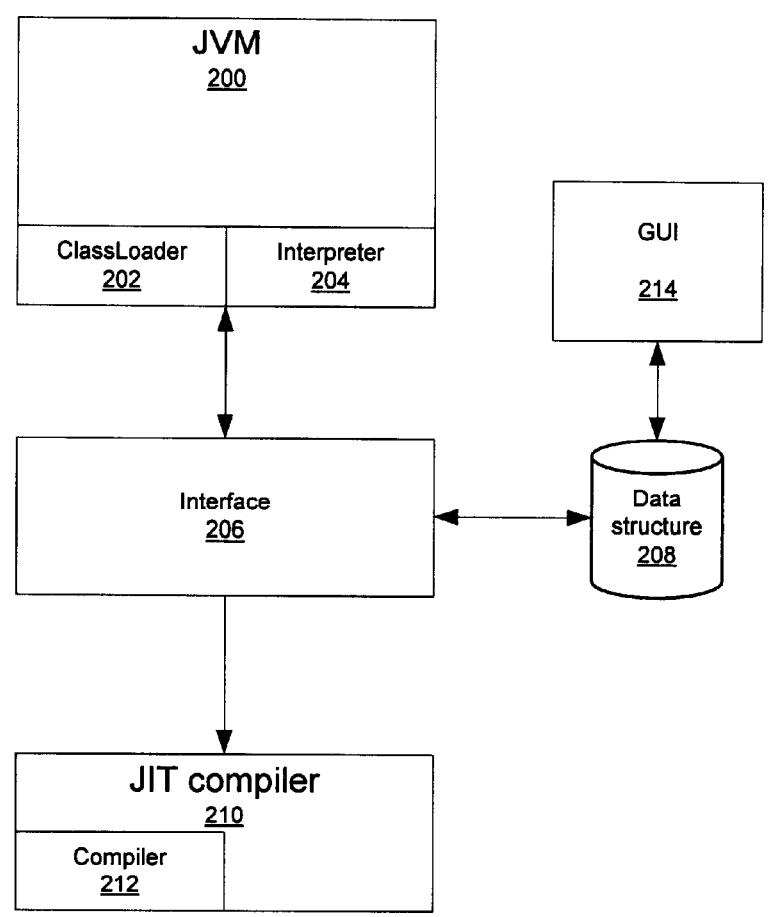
FIG. 2 is a diagram of components used to selectively process methods in accordance with a preferred embodiment of the present invention.

With reference now to FIG. 2, a diagram of components used to selectively process methods are depicted in accordance with a preferred embodiment of the present invention. In this example, JVM 200 includes a class loader 202 and interpreter 204. Interface 206 is the component containing the mechanism and process of the present invention. Data structure 208 is used by interface 206 to determine whether or not to JIT compile a method. Also shown in FIG. 2 is JIT compiler 210, which includes a compiler unit 212. JVM 200 and JIT compiler 210 contain other components, which are not shown to avoid obscuring the description of the present invention.

In the depicted example, an interface in the form of a graphical user interface (GUI) 214 is included to allow a user to define which methods or classes are to be JITed. These definitions are stored in data structure 208. Data structure 208 also may contain pre-defined definitions based on information supplied by the source of the application or applet in addition to definitions generated by the user.

When executing an application or applet, JVM 200 will start execution by invoking a method of a specified class. In the depicted example, this method may be for example, main. The method may be passed a single argument in the form of an array of strings. This causes the specified class to be loaded, linked to other types that it uses, and initialized. The loading of a class involves finding the binary form of a class or interface type with a particular name. In the depicted example, the loading process is implemented by Class-Loader 202. ClassLoader 202 in this example includes a ClassLoader class, which includes methods for loading new classes into the Java runtime environment. Interpreter 204 is a program that translates the bytecode to a native instruction and then executes the native instructions. The bytecode is translated into a form executable by the computer on which the JVM is located.

JIT compiler 210 includes a compiler unit 212 incorporating a compiler class, which includes methods for compiling methods to native instructions prior to execution. In this example, the compilation occurs only once per method. Some JIT compilers may compile entire classes, rather than one method at a time. A specific class or method may be compiled by passing an instance of the method or class to compiler unit 212 in JIT compiler 210.

Interface 206 receives the call or passing of the method destined for JIT compiler 210. Interface 206 may receive or intercept the method being passed to JIT compiler 210 by registering itself as a JIT compiler that is to receive the method in place of JIT compiler 210. The method is received from JVM 200 by interface 206 through a compile class API invoked by interpreter 204 in JVM 200. Interface 206 takes the method information received from ClassLoader 202 and determines whether or not to JIT compile the method. This determination may be made by comparing the method name to a list or table of methods in a data structure 208 containing user defined information about methods. The user defined information may be, for example, names of classes, names of methods, and JIT compile options. This data structure also may contain information for a specific JIT compiler, such as JIT compiler 210. If the method is to be JITed, the method is then passed on to JIT compiler 210. Otherwise, interface 206 may place a call to have interpreter 204 interpret the method. Alternatively, processing of the method may be terminated. Of course, the processes of the present invention may be applied to entire classes or to specific code paths within methods.

Figure 3:
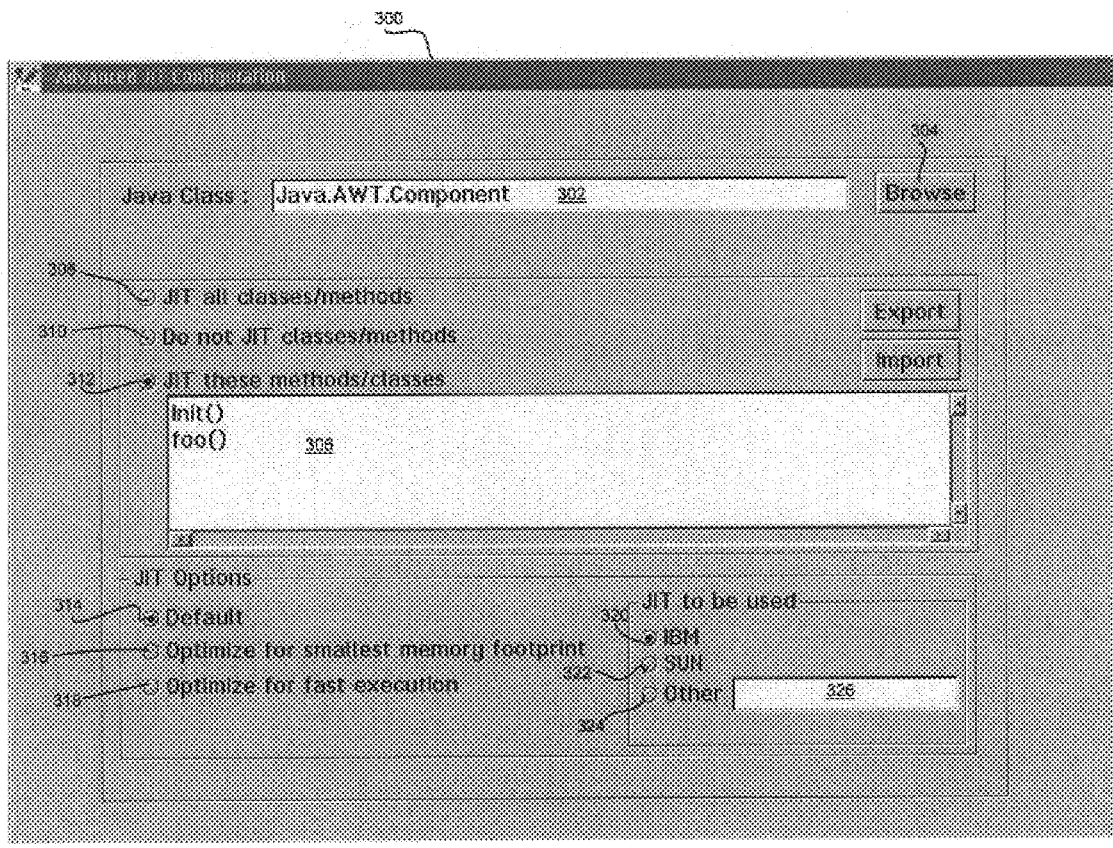
FIG. 3 is an illustration of a graphical user interface (GUI) used to define which class methods should or should not be just in time compiled in accordance with a preferred embodiment of the present invention.

With reference now to FIG. 3, an illustration of a graphical user interface (GUI) used to define which class methods should or should not be just in time compiled is depicted in accordance with a preferred embodiment of the present invention. In this example, GUI 300 includes a class field 302, which is used to select a Java class. Alternate classes may be selected by depressing browse button 304. In addition, GUI 300 includes a method field 306, which may contain identifications of various methods. Depending on the implementation, method names may be entered in field 306 or methods may be selected from a list of methods in field 306. Alternatively, field 306 may provide a list of classes from which the user may select. In the depicted example, the current class in class field 302 is Java.AWT-.Component with the following methods being identified in field 306: Init() and foo( ). GUI 300 provides a number of options for selecting which classes and/or methods should be JITed. Option 308 when selected, JIT compiles all classes and methods. Option 310 results in the selected classes and/or methods not being JITed. Option 312, the selected option in this example, results in only the selected classes and/or methods being JITed. If classes are listed in field 306, options 310-312 applies only to the listed class or classes. Additionally, the user may select various JIT compile options for the selected classes or methods. In the depicted example, option 314 provides for a default JIT compile option, while option 316 results in the JIT compiler being used to optimize for the smallest memory footprint in JITing the method or class. Option 318 results in the method or class being JITed to optimize for fast execution. In this example, the default option (option 314) has been selected. GUI 300 also allows a user to define the JIT compiler that is to be used to JIT compile the selected classes or methods. Option 320 results in an IBM JIT compiler being used to JIT compile the selected classes or methods. IBM JIT compilers are available from International Business Machines Corporation. Option 322 allows for a Sun JIT compiler to be used. Sun JIT compilers are available from Sun Microsystems Inc. Option 324 allows for a user to select or enter a different JIT compiler in field 326.

Through the use of GUI 300, the user is able to dynamically select or define which classes and/or methods should be JITed along with JIT compile options and the JIT compiler to be used. Of course, depending on the implementation, the user may be able to define other parameters, such as code paths within methods or the use of multiple JIT compilers.

Figures 4, 5:
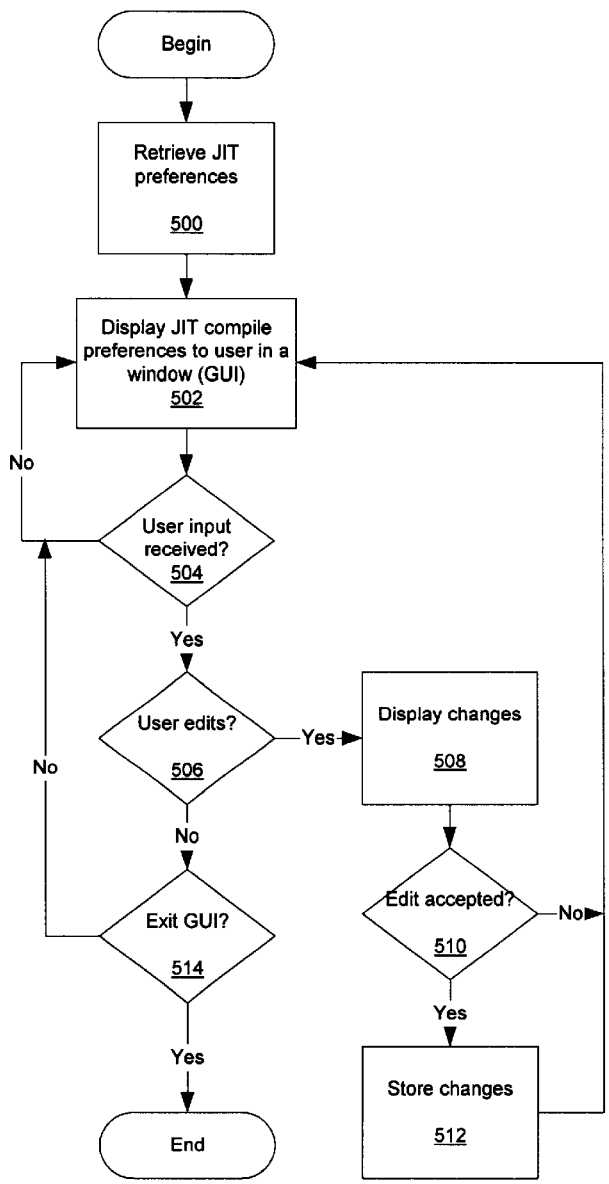
FIG. 4 is an example of a data structure containing user specified data for class/method information in accordance with a preferred embodiment of the present invention.
FIG. 5 is a flowchart of a process for allowing dynamic selection and defining of JIT compiling classes and methods in accordance with a preferred embodiment of the present invention.

In FIG. 4, an example of a data structure containing user specified data for class/method information is depicted in accordance with a preferred embodiment of the present invention. In the depicted example, methods are identified as both ones to JIT compile and not JIT compile. The methods that are to be JIT compiled also may contain various options, such as an identification of a JIT compiler to process the class/method and an option for use in processing the class/method.

Data structure 400 includes a number of entries 402–412 in which each entry identifies a class/method and an indication as to whether the method is to be JITed or not JITed. In addition, each entry in this example also includes an identification of a JIT compiler that is to be used to JIT compile a method along with a JIT compiler option. For example, entry 404 identifies class/method B in field 414 as having a "no-JIT" indication in field 416. In entry 406, class/method C is identified in field 418 as a method/class that is to be JITed, as indicated in field 420. An IBM JIT compiler is the selected JIT compiler as indicated in field 422 with a JIT compile option for size as illustrated in field 424.

Turning next to FIG. 5, a flowchart of a process for allowing dynamic selection and defining of JIT compiling classes and methods is depicted in accordance with a preferred embodiment of the present invention. The process begins by retrieving various JIT compile preferences from a data structure (step 500). These JIT compile preferences may include for example, the identification of the class or method, whether the class of method is to be JIT compiled, a JIT compiler, and JIT compile preferences. The data structure queried in step 500 may be one, such as data structure 400 in FIG. 4. Thereafter, the JIT compile preferences are displayed to a user in a GUI in the form of a window on a display device (step 502). A determination is then made as to whether user input has been received (step 504). If user input has not been received, the process returns to step 502 to continue displaying information.

Upon receiving user input, a determination is made as to whether the user has edited the JIT compile preferences (step 506). If the user has made edits, the process then displays these changes in the GUI (step 508). A determination is then made as to whether the edit to the JIT compile preferences has been accepted (step 510). If the edit has not been accepted, the process returns to step 502 to display the JIT compile preferences without the edits. If the edits are accepted, the changes to the JIT compile preferences are stored (step 512) with the process then returning to step 502 to display the JIT compile preferences with the changes. With reference again to step 506, if the user has not made edits to the JIT compile preferences, a determination is made as to whether the user input is to exit the GUI (step 514). If the user has not decided to exit the GUI, the process returns to step 502. Otherwise, the process terminates.

Figure 6:
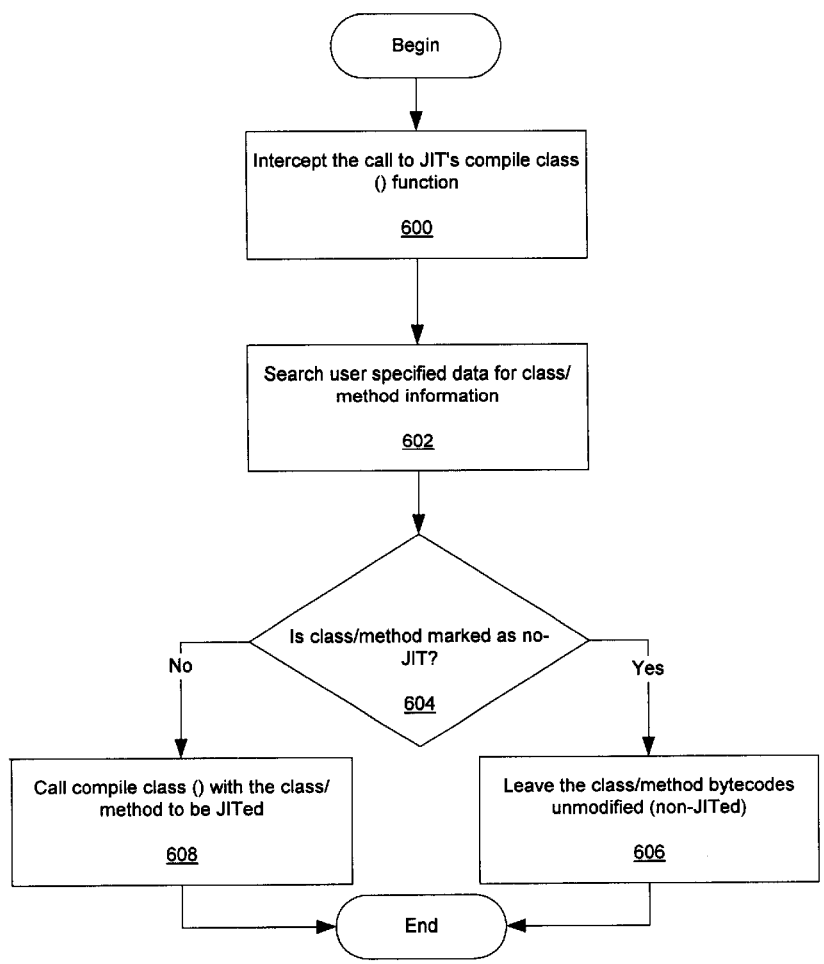
FIG. 6 is a flowchart of a process used to determine whether a method should be just in time compiled in accordance with a preferred embodiment of the present invention.

With reference now to FIG. 6, a flowchart of a process used to determine whether a method should be just in time compiled is depicted in accordance with a preferred embodiment of the present invention. The process begins by intercepting a call to the JIT compiler's compile class function (step 600). Thereafter, a search is made for user specified data for a particular class/method (step 602). This search may be made in a data structure containing information about various classes or methods. In particular, the information identifies methods that produce invalid results or errors when compiled by a JIT compiler. The information may be targeted to specific JIT compilers. A determination is then made as to whether the class/method has been marked as no JIT (step 604). This determination is made by comparing the method to be JITed to data within a data structure, such as data structure 400 in FIG. 4. If the class/method is not to be JITed, then the class/method bytecodes are unmodified (step 606) with the process terminating thereafter. These bytecodes may then be sent to the interpreter for execution. Otherwise, the class/method to be JITed is sent to the JIT compiler by calling compile class (step 608) with the process terminating thereafter. In step 608, data structure 400 in FIG. 4 may be checked to see if a particular JIT compiler or JIT compile option has been selected for the class/method. If no option is present for the class/method, a default JIT compiler and JIT compile option will be used.

Figure 7:
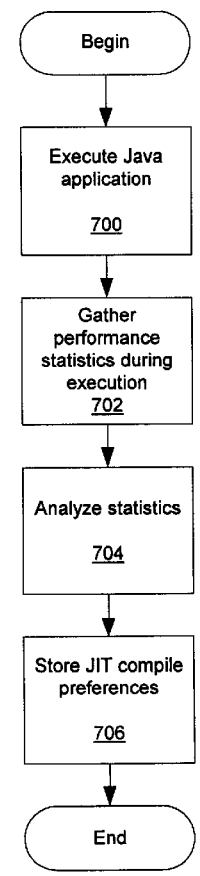
FIG. 7 is a flowchart of a process used to analyze a Java application in accordance with a preferred embodiment of the present invention.

With reference now to FIG. 7, a flowchart of a process used to analyze a Java application is depicted in accordance with a preferred embodiment of the present invention. This process is used to analyze a Java application or applet to predefine JIT compile preferences based on the analysis. This information may be supplied to a user along with the Java application or downloaded by the user at a later time. In this manner, fixes to errors in JIT compiling classes/methods may be provided to a user without having to alter the class/method or alter the JIT compiler. In addition, users may be supplied optimizations, such as selections of optimal JIT compilers and/or JIT compile options.

The process begins by executing the Java application (step 700). Thereafter, performance statistics during execution of the Java application are gathered (step 702). These statistics may include, for example, footprint size of the JIT compiled code, speed of execution of the JIT compiled code, a presence or absence of errors in executing the JIT compiled code, and the amount of time required to JIT compile a class or method. These statistics are analyzed against various performance criteria (step 704). Based on the analysis, determinations may be made as to whether a class or method shall be JIT compiled along with various optimization preferences. These results are stored as JIT compile preferences in a data structure (step 706), such as data structure 400 in FIG. 4 with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are nonspecific to a computer on which the instructions are to be executed. In such a case, a virtual machine on the computer may interpret the instructions or send the instructions to a compiler to generate code suitable for execution by the computer on which the virtual machine is located. The process also may be applied to entire classes, or individual methods or to paths in a method such a loop. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a computer for selectively just in time compiling a method, the process comprising the computer implemented steps of:

presenting compiling options for the method on an output device;

receiving user input changing the compiling options for the method;

monitoring for a call to just in time compile the method;

responsive to detecting the call to just in time compile the method, determining, based on the compiling options, whether the method should be compiled; and responsive to a determination that the method is to be compiled, sending the method to a just in time compiler.

2. The process of claim 1, wherein the compiling options are stored in a data structure.

3. The process of claim 1, wherein the presenting step comprises:

presenting the compiling options on a graphical user interface on a display device.

4. The process of claim 1 further comprising:

gathering performance statistics for the method; and creating the compiling options for the method for presentation on the output device using the performance statistics.

5. A process in a computer for executing a set of instructions, wherein the instructions are nonspecific to the computer and are for use with a virtual machine, the process comprising the computer implemented steps of:

presenting compiling information for a set of instructions on an output device;

receiving user input changing the compiling information for the set of instructions, wherein updated compiling information is formed;

monitoring for a call to compile the set of instructions;

responsive to detecting the call, determining, based on the updated compiling information, whether the instructions should be compiled into native code specific for the computer; and responsive to a determination that the set of instructions should be compiled, sending the set of instructions to a compiler designed to generate native code specific for the computer.

6. The methods of claim 5, wherein the set of instructions is a set of bytecodes.

7. The methods of claim 6, wherein the set of bytecodes forms a method.

8. The methods of claim 6, wherein the set of bytecodes forms a loop in a method.

9. The method of claim 5, further comprising:

generating compiling information for presentation on the output device for the set of instructions by analyzing performance statistics for the set of instructions.

10. The process of claim 5 further comprising:

gathering performance statistics for the set of instructions; and creating the compiling options for the set of instructions for presentation on the output device using the performance statistics.

11. An application execution system for use in a computer comprising:

a virtual machine, wherein the virtual machine receives a set of bytecodes for the execution;

a compiler, wherein the compiler generates native code specific for execution by the computer from bytecodes;

a graphical user interface, wherein the graphical user interface included has a number of modes of operation including:

a first mode of operation in which the graphical user interface displays compiling options for a plurality set of bytecodes;

a second mode of operation in which the graphical user interface receives input altering the compiling options;

a third mode of operation, responsive to receiving the input altering the compiling options, in which the graphical user interface saves the input altering the compiling options; and an interface, wherein the interface includes a number of modes of operation including:

a fourth mode of operation in which the interface monitors for a call to compile a set of bytecodes from the virtual machine;

a fifth mode of operation, responsive to detecting the call to compile the method in the first mode of operation, in which the interface determines, based on the compiling options, whether the set of bytecodes should be compiled; and a sixth mode of operation, responsive to a determination that the set of bytecodes is to be compiled, sending the set of bytecodes to the compiler.

12. The application execution system of claim 11, wherein the compiling options are stored in a data structure.

13. The application execution system of claim 11, wherein the set of bytecodes forms a method.

14. The application execution system of claim 11, wherein the set of bytecodes forms a portion of a method.

15. The application execution system of claim 11, wherein the Java application execution system includes a plurality of different compilers and wherein the compiling options includes a designation of a compiler within the plurality of different compilers.

16. The application execution systems of claim 15, wherein the compiler is a default compiler.

17. The application execution system of claim 11, wherein the interface includes:

a seventh mode of operation, responsive to an absence of a determination that the set of bytecodes is to be compiled, sending the set of bytecodes to the virtual machine to be interpreted.

18. The application execution system of claim 11, wherein the virtual machine is a Java virtual machine and wherein the compiler is a just in time compiler.

19. The application execution system of claim 11, wherein the compiling options are initially generated by an analysis of performance statistics of the set of bytecodes.

20. A data processing system in a computer for selectively just in time compiling a method, the data processing system comprising the computer implemented steps of:

presenting means for presenting compiling options for the method on an output device;

receiving means for receiving user input changing the compiling options for the method;

monitoring means for monitoring for a call to just in time compile the method;

determining means, responsive to detecting the call to just in time compile the method, for determining, based on the compiling options, whether the method should be compiled; and sending means, responsive to a determination that the method is to be compiled, for sending the method to a just in time compiler.

21. The data processing system of claim 20, wherein the compiling options are stored in a data structure.

22. The data processing system of claim 20, wherein presenting comprises:

presenting means for presenting the compiling options on a graphical user interface on a display device.

23. The data processing system of claim 20 further comprising:

gathering means for gathering performance statistics for the method; and creating means for creating the compiling options for the method for presentation on the output device using the performance statistics.

24. A data processing system in a computer for executing a set of instructions, wherein the instructions nonspecific to the computer are for use with a virtual machine, the process comprising the computer implemented steps of:

presenting means for presenting compiling information for a set of instructions on an output device;

receiving means for receiving user input changing the compiling information for the set of instructions, wherein updated compiling information is substituted for the compiling information;

monitoring means for monitoring a call to compile the set of instructions;

determining means, responsive to detecting the call, for determining, based on the updated compiling information, whether the instructions should be compiled into native code specific for the computer; and sending means, responsive to a determination that the set of instructions should be compiled, for sending the set of instructions to a compiler designed to generate native code specific for the computer.

25. The data processing system of claim 24, wherein the set of instructions is a set of bytecodes.

26. The data processing system of claim 25, wherein the set of bytecodes forms a method.

27. The data processing system of claim 25, wherein the set of bytecodes forms a loop in a method.

28. The data processing system of claim 24, further comprising:

generating means for generating compiling information for presentation on the output device for the set of instructions by analyzing performance statistics for the set of instructions.

29. The data processing system of claim 24 further comprising:

gathering means for gathering performance statistics for the set of instructions; and creating means for creating the compiling options for the set of instructions for presentation on the output device using the performance statistics.

30. A computer program product in a computer readable medium for selectively just in time compiling a method, the computer program product comprising:

first instructions for presenting compiling options for the method on an output device;

second instructions for receiving user input changing the compiling options for the method;

third instructions for monitoring a call to just in time compile the method;

fourth instructions, responsive to detecting the call to just in time compile the method, for determining, based on the compiling options, whether the method should be compiled; and fifth instructions, responsive to a determination that the method is to be compiled, for sending the method to a just in time compiler.

31. A computer program product in a computer readable medium for executing a set of instructions, wherein the instructions nonspecific to the computer are for use with a virtual machine, the computer program product comprising:

first instructions for presenting compiling information for a set of instructions on an output device;

second instructions for receiving user input changing the compiling information for the set of instructions, wherein updated compiling information is formed;

third instructions for monitoring a call to compile the set of instructions;

fourth instructions, responsive to detecting the call, for determining, based on the updated compiling information, whether the instructions should be compiled into native code specific for the computer; and fifth instructions, responsive to a determination that the set of instructions should be compiled, for sending the set of instructions to a compiler designed to generate native code specific for the computer.

* * * * *